USOO5189162A

United States Patent [19]

Smith

[11] Patent Number: 5,189,162
[45] Date of Patent: * Feb. 23, 1993

[54] UNSYMMETRICAL TRIPHENODIXOAZINE REACTIVE DYES

[75] Inventor: Peter Smith, Bury, England

[73] Assignee: Imperial Chemical Industries PLC, London, England

[*] Notice: The portion of the term of this patent subsequent to May 28, 2008 has been disclaimed.

[21] Appl. No.: 607,687

[22] Filed: Nov. 1, 1990

[30] Foreign Application Priority Data

Nov. 16, 1989 [GB] United Kingdom ............... 8925900

[51] Int. Cl.$^5$ ................. C07D 498/04; C09B 19/02; C09B 62/44
[52] U.S. Cl. ........................................ 544/75; 8/543; 8/549
[58] Field of Search ........................................ 544/75

[56] References Cited

U.S. PATENT DOCUMENTS

| 4,786,728 | 11/1988 | Schwaiger et al. | 544/77 |
|---|---|---|---|
| 4,841,049 | 6/1989 | Seitz | 544/76 |
| 4,851,527 | 7/1989 | Springer et al. | 544/75 |
| 5,019,134 | 5/1991 | Ridyard et al. | 544/76 |
| 5,057,609 | 10/1991 | Jager et al. | 544/75 |

FOREIGN PATENT DOCUMENTS

| 0101665 | 2/1984 | European Pat. Off. . |
| 0260227 | 3/1988 | European Pat. Off. . |
| 0304924 | 3/1989 | European Pat. Off. . |
| 0385120 | 5/1990 | European Pat. Off. . |
| 3625347 | 3/1987 | Fed. Rep. of Germany . |
| 2297232 | 8/1976 | France . |
| 1289867 | 11/1989 | Japan . |
| 2228738 | 9/1990 | United Kingdom . |

OTHER PUBLICATIONS

European Search Report and Annex, Application No. EP 90 31 1430 (Dec. 1990).

Primary Examiner—Mukund J. Shah
Assistant Examiner—Philip Datlow
Attorney, Agent, or Firm—Cushman, Darby & Cushman

[57] ABSTRACT

The specification describes cellulose reactive unsymmetrical triphenodiaxazine dyes of the Formula (1):

wherein
each of $T^1$ and $T^2$, independently, represents H, Cl, Br, F, $SO_3H$ or an optionally substituted alkyl or aryl radical;
each of $A^1$ and $A^2$ independently represents alkyl, alkoxy, Cl, Br, COOH, $SO_3H$ or optionally substituted sulphamoyl;
each n independently has a value of 0, 1 or 2;
each m independently has a value of 1 or 2;
$R^1$ represents H or an optionally substituted hydrocarbon radical;
Q represents O or S;
x has a value of 0 or 1;
B represents an optionally substituted divalent hydrocarbon radical;
each of $R^2$ and $R^3$, independently, represents H or an optionally substituted hydrocarbon radical or $R^2$ and $R^3$ are joined together to form, with B and the two N atoms, a piperazine ring;
y has a value of 0 or 1, and
Z represents H, or an optionally substituted hydrocarbon radical or a fibre-reactive group;

provided that (1) at least one of $R^1$ and Z contains a fibre-reactive group; and (2) y is 0 when $R^1$ does not contain a fibre-reactive group.

10 Claims, No Drawings

UNSYMMETRICAL TRIPHENODIXOAZINE REACTIVE DYES

This invention relates to reactive dyes, and intermediate compounds in their preparation, and more particularly to reactive dyes of the triphenodioxazine series and their application to textile materials.

Reactive dyes of the triphenodioxazine series are known and have been described in, for example, United Kingdom Patent Specifications 1349513, 1368158, 1450746, 1477071, 1559752 and 2059985 and in European Patent Specifications 212635, 260227 and 299328.

The present invention provides triphenodioxazine reactive dyes which, in the free acid form, have the Formula (1):

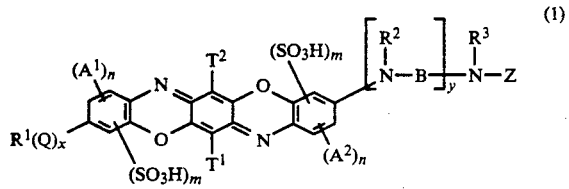

wherein
each of $T^1$ and $T^2$, independently, represents H, Cl, Br, F, $SO_3H$ or an optionally substituted alkyl or aryl radical;
each of $A^1$ and $A^2$ independently represents optionally substituted alkyl or alkoxy, Cl, Br, COOH, $SO_3H$ or optionally substituted sulphamoyl;
each n independently has a value of 0, 1 or 2;
each m independently has a value of 1 or 2;
$R^1$ represents H or an optionally substituted hydrocarbon radical;
Q represents O or S;
x has a value of 0 or 1;
B represents an optionally substituted divalent hydrocarbon radical;
each of $R^2$ and $R^3$, independently, represents H or an optionally substituted hydrocarbon radical or $R^2$ and $R^3$ are joined together to form, with B and the two N atoms, a piperazine ring;
y has a value of 0 or 1, and
Z represents H, or an optionally substituted hydrocarbon radical or a fibre-reactive group;
provided that (1) at least one of $R^1$ and Z contains a fibre-reactive group; and (2) y is 0 when $R^1$ does not contain a fibre-reactive group.

Examples of optionally substituted alkyl and alkoxy radicals which may be represented by $T^1$ and $T^2$ particularly include $C_{1-4}$-alkyl and $C_{1-4}$-alkoxy radicals, especially methyl and methoxy. Examples of optionally substituted aryl radicals which may be represented by $T^1$ and $T^2$ include optionally substituted phenyl radicals, for example phenyl and sulphophenyl.

It is preferred that each of $T^1$ and $T^2$ is Cl or Br.

Examples of alkyl and alkoxy radicals which may be represented by $A^1$ and $A^2$ particularly include $C_{1-4}$-alkyl and $C_{1-4}$-alkoxy radicals. In most cases, $A^1$ and $A^2$ will be identical.

It is preferred that n is 0 and that m is 1.

When any of $T^1$, $T^2$, $A^1$, $A^2$, $R^1$, $R^2$, $R^3$, B and Z are "optionally substituted" it is preferred that the optional substitutents are selected from the group H; methyl; halo, especially chloro; hydroxy; $-CO_2H$; $-SO_3H$; $-NH_2$; $-CN$; $C_{1-4}$-alkoxy, especially methoxy; and acetamido.

Fibre-reactive groups have been fully described in the prior art, for example in our GB-A-2063284. Such groups are capable, under suitable conditions, of reacting with the hydroxyl groups present in cellulosic fibres or with the amino groups present in natural and synthetic polyamide fibres to form a covalent linkage between the dye and the fibre.

As examples of fibre-reactive groups which may be represented by Z or may be present in $R^1$ and/or Z when these are substituted hydrocarbon radicals, there may be mentioned aliphatic sulphonyl groups which contain a sulphate ester group in beta-position to the sulphur atom, e.g. beta-sulphato-ethylsulphonyl groups, beta-thiosulphato-ethylsulphonyl groups, alpha,beta-unsaturated acyl radicals of aliphatic carboxylic acids, for example acrylic acid, alpha-chloro-acrylic acid, alpha-bromoacrylic acid, propiolic acid, maleic acid and mono- and dichloro maleic acids; also the acyl radicals of acids which contain a substituent which reacts with cellulose in the presence of an alkali, e.g. the radical of a halogenated aliphatic acid such as chloroacetic acid, beta-chloro and beta-bromopropionic acids and alpha,beta-dichloro-and dibromopropionic acids or radicals of vinylsulphonyl- or beta-chloroethylsulphonyl- or beta-sulphatoethyl-sulphonyl-endo-methylene cyclohexane carboxylic acids. Other examples of cellulose reactive groups are tetrafluoro-cyclobutyl carbonyl, trifluoro-cyclo butenyl carbonyl, tetrafluoro-cyclobutylethenyl carbonyl, trifluoro-cyclobutenylethenyl carbonyl; activated halogenated 1,3-dicyanobenzene radicals such as 2,4-dicyano-3,5-difluoro-6-chlorophenyl, 2,4-dicyano-3,5-difluoro-6-nitrophenyl, 2,4-dicyano-3,5,6-trifluorophenyl, 2,4-dicyano-3,5,6-trichlorophenyl, 2,4,6-tricyano-3,5-difluorophenyl, 2,4,6-tricyano-3,5-dichlorophenyl and heterocyclic radicals which contain 1, 2 or 3 nitrogen atoms in the heterocyclic ring and at least one cellulose reactive substituent on a carbon atom of the ring.

It may be noted that many reactive groups may be defined as both heterocyclic or acyl groups since they consist of an acyl group carrying a heterocyclic substituent. For convenience in such cases where the heterocyclic ring carries the cellulose reactive substituent these are usually referred to as heterocyclic reactive groups in this specification.

As examples of such heterocyclic radicals there may be mentioned for example:
2:3-dichloroquinoxaline-5- or -6-sulphonyl,
2:3-dichloroquinoxaline-5- or -6-carbonyl,
2:3-dichloroquinazolin-6- or -7-sulphonyl,
2:4:6-trichloroquinazolin-7- or -8-sulphonyl,
2:4:7- or 2:4:8-trichloroquinazolin-6-sulphonyl,
2:4-dichloroquinazolin-6-carbonyl,
1:4-dichlorophthalazine-6-carbonyl,
4:5-dichloropyridazon-1-yl-ethylcarbonyl,
2:4-dichloropyrimidine-5-carbonyl,
4-(4':5'-dichloropyridaz-6'-on-1'-yl)benzoyl,
2-chlorobenzthiazole-6-carbonyl,
3,6-dichloropyrazin-4-carbonyl,
4-(4':5'-dichloropyridaz-6'-on-1'-yl)phenylsulphonyl;
activated 4,6-dihalopyridin-2-yl and 2,6-dihalopyridin-4-yl groups such as:
3,4,5,6-tetrafluoropyridin-2-yl,
2,3,5,6-tetrafluoropyridin-4-yl,
2,4,6-trifluoro-3-cyanopyridin-4-yl,
2,5,6-trichloro-3-cyanopyridin-4-yl, 2,6-difluoro-3-cyano-5-chloropyridin-4-yl,
2,6-difluoro-3,5-dichloropyridin-4-yl and more particularly triazinyl or pyrimidinyl groups.

Examples of particular pyrimidinyl groups are pyrimidin-2-yl or -4-yl groups having a cellulose reactive atom or group especially Cl, Br or F in at least one of the remaining 2-, 4- and 6-positions. The 5-position may carry various substituents such as Cl or CN which are not normally fibre reactive in themselves but may enhance the reactivity of substituents in other positions of the pyrimidine ring. As specific examples of such pyrimidinyl groups there may be mentioned:
2,6-dichloropyrimidin-4-yl,
4,6-dichloropyrimidin-2-yl,
2,5,6-trichloropyrimidin-4-yl,
4,5,6-trichloropyrimidin-2-yl,
5-chloro-2-methylsulphonyl-6-methylpyrimidin-4-yl,
2,6-dichloro-5-cyanopyrimidin-4-yl,
4,6-dichloro-5-cyanopyrimidin-2-yl,
2,6-difluoro-5-chloropyrimidin-4-yl,
4,6-difluoro-5-chloropyrimidin-2-yl,
2,6-difluoro-5-cyanopyrimidin-4-yl,
4,6-difluoro-5-cyanopyrimidin-2-yl.

Examples of particular triazinyl groups are triazin-2-yl groups having fibre reactive atoms or groups on one or both of the 4-and 6-positions. In this instance a wide range of fibre reactive atoms or groups are available such as activated aryloxy or various groups linked through a sulphur atom, e.g. $SO_3H$ but the preferred fibre reactive atoms or groups are F, Br or especially Cl; quaternary ammonium groups such as tri-lower alkyl ammonium, e.g. $(CH_3)_3N^+-$ and pyridinium groups especially those derived from pyridine carboxylic acids in particular from nicotinic or isonicotinic acid.

The triazinyl groups having only one fibre reactive atom or group on the nucleus in the 4- or 6-position may have a substituent not fibre reactive in the remaining 4- or 6-position.

As examples of such non-reactive substituents there may be mentioned alkyl or aryl thio groups, alkoxy or aryloxy groups and optionally substituted amino groups.

Preferred forms of these non-fibre reactive groups include lower, i.e. $C_{1-4}$-alkoxy, e.g. methoxy, ethoxy, n-propoxy and iso-propoxy, butoxy and lower alkoxy lower alkoxy, e.g. beta-methoxy-ethoxy, beta-ethoxyethoxy, phenoxy and sulphophenoxy; amino; lower alkylamino, e.g. methylamino, ethylamino, butylamino, di(lower alkyl)amino, e.g. dimethylamino, diethylamino, methylethylamino, dibutylamino and groups of the latter two types in which the alkyl groups are substituted, in particular by OH, CN or $SO_3H$, e.g. beta-hydroxyethylamino, di(beta-hydroxyethyl)amino, beta-cyanoethylamino, di(beta-cyanoethyl)amino, beta-sulphoethylamino, beta-hydroxypropylamino, (beta-hydroxybutyl)ethylamino and (beta-hydroxyethyl)methylamino; cycloalkylamino, e.g. cyclohexylamino; cyclic amino, e.g. morpholino or piperazino; naphthylamino substituted by 1,2 or 3 $SO_3H$ groups and optionally substituted phenyl amino groups.

Especially preferred optionally substituted phenylamino groups have the formula:

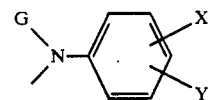

where G=H, methyl, ethyl, sulphomethyl, beta-carboxy-, beta-hydroxy-or beta-cyanoethyl and Y and X are each independently selected from H, COOH, $SO_3H$, $CH_3$, $C_2H_5$, $OCH_3$, $OC_2H_5$, Cl, Br, CN, $NO_2$, $NHCOCH_3$ and beta-sulphatoethylsulphonyl.

Optionally substituted hydrocarbon radicals which may be represented by $R^1$, $R^2$, $R^3$ and Z include optionally substituted alkyl (especially optionally substituted $C_{1-4}$-alkyl), and optionally substituted aryl (especially optionally substituted phenyl) radicals. Appropriate substituents for $R^1$ and Z include fibre-reactive groups, for example those mentioned above. Thus, for example, $R^1$ and/or Z may be an alkylene or arylene radical, especially a phenylene radical, having a sulphatoethylsulphonyl substituent or a substituent which is convertible by means of alkali to a vinyl sulphone group.

Optionally substituted divalent hydrocarbon radicals which may be represented by B include alkylene, especially $C_{1-4}$-alkylene; aralkylene, preferably aralkylene having less than 13, and especially from 7 to 12 carbon atoms; and arylene, preferably arylene having less than 7, and especially having 6 carbon atoms; all of which are either unsubstituted or substituted.

As examples of alkylene, arylene and aralkylene radicals which may be represented by B, there may be mentioned:
ethylene,
1,2- & 1,3-propylene,
2-hydroxy-1,3-propylene,
1- and 2-phenyl-1,3-propylene,
2-(4'-sulphophenyl)-1,3-propylene,
1,4-, 2,3- & 2,4-butylene,
2-methyl-1,3-propylene,
2-methyl-2,4-pentylene,
2,2-dimethyl-1,3-propylene,
1-phenylethylene,
1-chloro-2,3-propylene,
2,3-diphenyl-1,4-butylene
1-(methoxycarbonyl)-1,5-pentylene,
1-carboxy-1,5-pentylene,
2,7-heptylene,
3-methyl-1,6-hexylene,
$-CH_2CH_2OCH_2CH_2-$,
$-CH_2CH_2SCH_2CH_2-$,
$-CH_2CH_2SSCH_2CH_2-$,
1,2- 1,3- & 1,4-phenylene,
1,4- & 1,5-naphthylene,
1,6- & 2,5-hexylene.

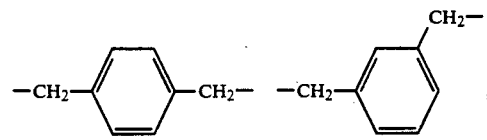

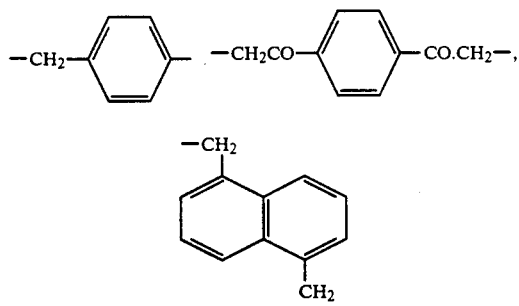

The radicals represented by B containing one or more benzene and/or naphthalene nuclei may optionally be sulphonated.

It is preferred that any fibre-reactive groups represented by Z, or which may be present in $R^1$ and/or Z when these are substituted hydrocarbon radicals, are vinylsulphonyl groups or precursor groups thereof or, especially, halogenotriazinyl groups, for example monochlorotriazinyl, monofluorotriazinyl or dichlorotriazinyl groups.

According to a further aspect of the present invention there is provided a liquid dye preparation comprising a dye of Formula (1) and a liquid medium. Such liquid dye preparations preferably contain at least 5 parts, more preferably at least 15 parts, especially 15 to 50 parts, of the dye per 100 parts of liquid medium (all parts are by weight).

A preferred liquid medium is water and it is preferred that the dye is completely dissolved in the liquid medium. The solubility of the dye in water can be improved by substantial removal of inorganic salts, such as NaCl, using a membrane separation process, e.g. Reverse Osmosis.

The dyes of the invention may be prepared by analogous reactions to those conventional in triphenodioxazine chemistry. Thus, for example, dyes of the invention may be prepared by reacting an acylating agent capable of introducing a fibre-reactive group into an unsymmetrical triphenodioxazine compound of the Formula (2):

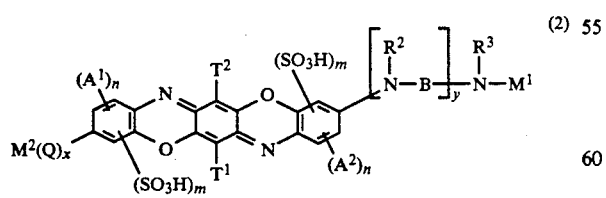

wherein $T^1$, $T^2$, $A^1$, $A^2$, n, m, Q, x, B, $R^2$, $R^3$ and y have the same meanings as in Formula (1), $M^1$ and $M^2$ are independently H or an optionally substituted hydrocarbon radical with the proviso that (i) at least one of $M^1$ and $M^2$ is H or a hydrocarbon radical having an acylatable substituent; and (ii) y is 0 when $M^2$ contains no acylatable substituents. The compounds of Formula (2) form a further aspect of the present invention, particularly those in which $M^1$ and/or $M^2$ are H. Suitable acylating agents particularly include cyanuric chloride and its primary condensation products with ammonia, primary or secondary amines, alcohols or mercaptans. The term "acylatable substituent" means any substituent which is capable of condensing with an acylating agent in the presence of base, and particularly includes primary and secondary amino groups.

Compounds of Formula (2) may be obtained by analogous methods to those described in the prior art, for example by ring closure of the corresponding unsymmetrical dianilides using strongly acid condensing agents, for example oleum with a persulphate. Thus, a compound of Formula (2) may be prepared by ring closure of the unsymmetrical dianilinide of Formula (3) using oleum with a persulphate:

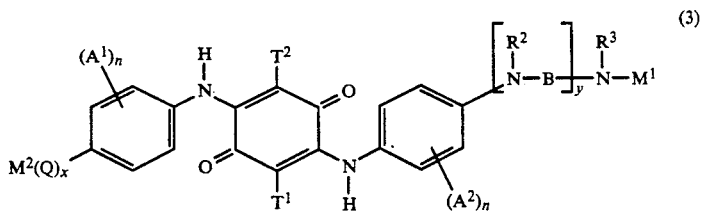

wherein $T^1$, $T^2$, $A^1$, $A^2$, n, Q, x, B, $R^2$, $R^3$, y, $M^1$ and $M^2$ have the meanings and proviso given above in relation to Formula (2). Sulphonic acid groups may be introduced into the dianilide during cyclisation, for example into any aryl groups represented by $M^2$.

The unsymmetrical dianilides may be made in a stepwise manner by analogous methods to those described in the art, for example in United Kingdom Patent Specifications 509891 and 509893 and European Patent Specification 0356014 A1 Examples 22 to 39. The unsymmetrical dianilides may be prepared, for example, by condensation of a monoanilinide of Formula (4), with a compound of Formula (5), wherein $T^1$, $T^2$, $A^1$, $A^2$, n, Q, x, B, $R^2$, $R^3$, y, $M^1$ and $M^2$ have the meanings and proviso given above in relation to Formula (3). It is preferred that the condensation is carried out in a solvent, such as water or methanol, at a pH of approximately 7, (e.g. pH 6.0 to 7.5) and at elevated temperatures of around 50° C. (e.g. 40° to 60° C.) for a period of several hours (e.g. 4 to 24 hours).

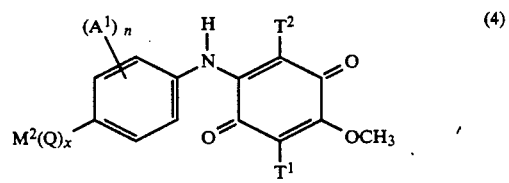

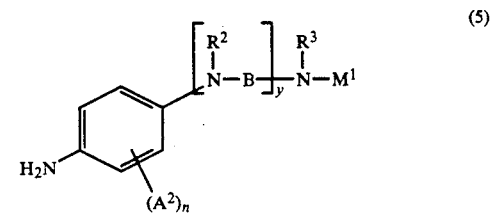

The monoanilinides of Formula (4) from which unsymmetrical dianilinides are prepared may themselves be prepared in an analogous manner to the process described in European Patent Specification 0356014 A1, particularly page 10 line 25 to page 12 line 20, wherein an aniline derivative containing a group of formula $M^2(Q)_x$ at the para position (wherein $M^2$, Q and x are as hereinbefore defined) is condensed with 2-methoxy-3,5,6-trichlorobenzoquinone ("MEBK"). It is preferred that the condensation takes place in a solvent, e.g. methanol or water, a temperature of 18° C. to 50° C. is commonly employed, and a pH of approximately 5-6 over a period of for example ½ to 24 hours is normally sufficient. Where reaction of a substituted aniline derivative with MEBK gives undesired bis adduct wherein two molecules of the substituted aniline derivative have reacted with one mole of MEBK, this can be removed, if desired by conventional purification such as preparative chromatography, crystallisation or filtration.

The dyes prepared as described above may be isolated by any conventional means, for example by spray drying or precipitation and filtration.

The dyes contain sulphonic acid groups which confer water-solubility and they may be isolated with such groups in the free acid form. However, it is usually found more convenient to isolate the dyes in the form of salts particularly alkali metal salts, especially sodium but sometimes lithium to improve the water-solubility.

The dyes of the present invention may be used for colouring a wide range of textile materials containing hydroxyl or amino groups, for example wool, silk, synthetic polyamides and natural or regenerated cellulose, for example cotton or viscose rayon materials, by conventional dyeing, padding or printing methods used for colouring such materials with water-soluble reactive dyes. In the case of cellulose, they are preferably applied in conjunction with a treatment with an acid binding agent, for example caustic soda, sodium carbonate, phosphate, silicate or bicarbonate, which may be applied to the cellulose textile materials before, during or after the application of the dye.

The dyes of the present invention are valuable reactive dyes for cellulose. They yield brightly coloured textiles with good resistance to washing, chlorine and light.

The invention is illustrated but not limited by the following examples in which all parts and percentages are by weight unless otherwise indicated.

Dyebases

EXAMPLE 1

Preparation of the dyebase of Formula (7) wherein $M^2(Q)_x$ is 4-sulphophenoxy, and W is $NH_2$

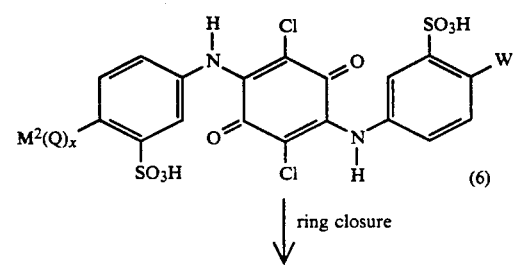

(6)

ring closure

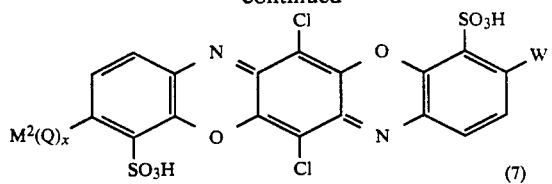

(7)

The dianilide of Formula (6) wherein W is $NH_2$ and $M^2(Q)_x$ is phenoxy (19 g) was dissolved in conc. $H_2SO_4$ (350 ml) at 20° C. and stirred for 1 hour. $MnO_2$ (11.4 g) was added in one portion, causing the temperature to increase to approximately 43° C. The mixture was stirred for 1 hour, then added dropwise to water (1.75 liters), with cooling to 18° C. The product was filtered, salted to 25% w/v with NaCl, stirred for 1½ hours and the product filtered off to give a solid. solid was washed with saturated brine until the washings were acid free, and dried over $CaCl_2$ to give the title compound (19 g). The yield was estimated by HPLC to be approximately 86%.

EXAMPLES 2 TO 9

Following the method outlined in Example 1 the following dyebases of Formula (7) may be prepared by ring closure of the dianilinide of Formula (6) wherein $M^2$, $(Q)_x$ and W are as defined in the table immediately below:

| Example | $(Q)_x$ | $M^2$ | W |
|---|---|---|---|
| 2 | S | sulphophenyl | $NH_2$ |
| 3 | O | $CH_3$ | $NH_2$ |
| 4 | S | $CH_3$ | $NH_2$ |
| 5 | O | 4-(beta-sulphatoethyl sulphonyl)phenyl | $NH_2$ |
| 6 | O | 4-amino-2-sulphophenyl | $NH_2$ |
| 7 | S | 4-amino-2-sulphophenyl | $NH_2$ |
| 8 | O | 4-amino-2-sulphophenyl | $NH(CH_2)_2NH_2$ |
| 9 | S | 4-amino-2-sulphophenyl | $NH(CH_2)_2NH_2$ |

Dyes

EXAMPLE 10

Preparation of the dye of Formula (7) wherein W is 3-chloro-5-methoxytriazinylamino and $M^2(Q)_x$ is 4-sulphophenoxy To a solution of dyebase from Example 1 (1.6 g) in water (125 ml) and Calsolene oil (1 drop), pH 6-7 and 20° C., was added methoxydichloro-s-triazine (0.5 g) and the mixture stirred at 20° C. whilst maintaining the pH at between 6-7. The mixture was stirred at 40° C. (2.5 hr), 45°-50° C. (2.5 hr) before adding a further 0.5 g of methoxydichloro-s-triazine, and stirring continued at 45°-50° C.

A further 1.0 g of methoxydichloro-s-triazine was added and the mixture stirred at 45°-50° C., pH 6-7, for 5 hours, before adding a further 1.0 g of methoxydichloro-s-triazine and stirring for a further 17 hours.

The pH was adjusted to 7.5 and the mixture filtered. The liquors were salted to 35% w/v NaCl, stirred 20 minutes and the product filtered off, washed with saturated brine and dried in vacuo over $CaCl_2$ to give the title product as a deep violet coloured solid.

EXAMPLE 11

Preparation of the dye of Formula (7) wherein W is 3-(2,4-disulphophenylamino)-5-chlorotriazinylamino and $M^2(Q)_x$ is 4-sulphophenoxy Stage 1

A solution of aniline-2,4-disulphonic acid ("ADSA") (3.89 g) in water (40 ml) and 0.2 g mixed phosphate buffer was cooled to 0°–5° C. before adding cyanuric chloride (2.2 g) and Calsolene oil (2–3 drops). The mixture was stirred overnight at 0°–5° C., pH 6–7, and screened to give a solution of 2-(2,4-disulphophenylamino)-4,6-dichlorotriazine ("2-DSP").

Stage 2

To a solution of the dyebase from Example 1 (5 g) in water (810 ml) at pH 7 at 40°–50° C. was added the solution of 2-DSP prepared in Stage 1. The pH was maintained at between 6 and 7, and after 48 hours HPLC indicated that approximately 36% of dyebase remained.

Cyanuric chloride (0.5 g) was added and the mixture stirred at 50°–60° C. for 3 hours, before adding ADSA (2.7 g). The mixture was stirred at 50°–60° C. for 14 hours at pH 6–7, then stood at room temperature for approximately 65 hours, after which HPLC indicated around 2% dyebase, 60% title product and 15% dichlorotriazinyl dyebase.

A further portion of ADSA (1.5 g) was added at pH 6–7 and the mixture stirred at 50° C. for 3 hours. The mixture was filtered to remove solids and the filtrate salted to 30% w/v NaCl and stirred at room temperature. The precipitated title product was filtered off, washed with saturated brine, dried in vacuo over $CaCl_2$.

EXAMPLE 12

Preparation of the dye of Formula (7) wherein W is 3,5-dichlorotriazinylamino and $M^2(Q)_x$ is 4-sulphophenoxy To a solution of the dyebase from Example 1 (5 g) in water (350 ml), pH 8–9, 30° C., was added a few drops of Calsolene oil, 0.5 g of mixed phosphate buffer, and cyanuric chloride (1.6 g). The mixture was stirred at 30° C., pH 8–9 for 1.75 hours, after which HPLC indicated a mixture of approximately 50% starting dyebase and 50% title product.

A further portion of cyanuric chloride (2.9 g) was added and the mixture stirred overnight, after which HPLC indicated no starting dyebase remained.

The mixture was filtered and the liquors salted to 34% w/v with NaCl, stirred for 1 hour and the precipitate filtered off and washed with saturated brine before drying in vacuo over $CaCl_2$ to give 3.8 g of title product, which was estimated to have a strength of 43%. The title product gave bright rubine dyeings of cellulosic textile materials.

EXAMPLES 13 TO 20

Useful dyes may be obtained if the procedure of Example 11 is followed except that the dyebase of Example 1 is replaced by an equivalent amount of the following dyebases.

| Example | Dyebase from Example |
| --- | --- |
| 13 | 2 |
| 14 | 3 |
| 15 | 4 |
| 16 | 5 |
| 17 | 6 |
| 18 | 7 |
| 19 | 8 |
| 20 | 9 |

EXAMPLES 21 TO 66

Following the procedure in Example 10 further dyes may be obtained if the methoxydichloro-s-triazine used in Example 10 is replaced by an equivalent amount of the following acylating agents.

| Example | Acylating Agent |
| --- | --- |
| 21 | 2,4-dichloro-6-beta-hydroxyethylamino-s-triazine |
| 22 | 2,4-dichloro-6-di-beta-hydroxyethylamino-s-triazine |
| 23 | 2,4-dichloro-6-beta-hydroxypropylamino-s-triazine |
| 24 | 2,4-dichloro-6-amino-s-triazine |
| 25 | 2,4-dichloro-6-methylamino-s-triazine |
| 26 | 2,3-dichloroquinoxaline-6-sulphonyl chloride |
| 27 | 2,4,5,6-tetrachloropyrimidine |
| 28 | 2,4-dichloro-6-n-butoxy-s-triazine |
| 29 | 2,4-dichloro-6-dimethylamino-s-triazine |
| 30 | 2,4,6-trichloropyrimidine |
| 31 | 1,4-dichlorophthalazine-6-carbonyl chloride |
| 32 | 2,4,6-trichloro-5-cyanopyrimidine |
| 33 | 2,4-dichloro-6-p-sulphophenoxy-s-triazine |
| 34 | 2,4,6-trifluoro-5-chloropyrimidine |
| 35 | 1-(4'-chlorocarbonylphenyl)-4,5-dichloro-6-pyridazone |
| 36 | 2,4,6-tribromopyrimidine |
| 37 | 2,4-dichloro-6-beta-sulphatoethylamino-s-triazine |
| 38 | 2-(2',4'-dichloro-s-triazinylamino-5-(2'-chloro-4'-m-sulphoanilino-s-triazinylamino)benzene sulphonic acid |
| 39 | 2-(2',4'-dichloro-s-triazinylamino)-5-(2'-chloro-4'-amino-s-triazinylamino)benzene sulphonic acid |
| 40 | 2-(2',4'-dichloro-s-triazinylamino)-5-(2'-chloro-4'-(3'',5''-disulphoanilino)-s-triazinylamino)benzene sulphonic acid |
| 41 | 2,4-dichloro-6-(3'-sulphatoethylsulphonylanilino)-s-triazine |
| 42 | 2,4-difluoro-6-(3'-sulphoanilino)-s-triazine |
| 43 | 2-(2',4'-dichloro-s-triazinylamino)-4-(2'-chloro-4'-m-sulphoanilino-s-triazinylamino)benzene-1,5-disulphonic acid |
| 44 | 2-(2',4'-dichloro-s-triazinylamino)-4-(2'-chloro-4'-amino-s-triazinylamino)benzene-1,5-disulphonic acid |
| 45 | 2-(2',4'-dichloro-s-triazinylamino)-4-[2'-chloro-4'-(3'',5''-disulphoanilino)-s-triazinylamino]benzene-1,5-disulphonic acid |
| 46 | 2-(2',4'-dichloro-s-triazinylamino)-4-[2'-chloro-4'-(2'',5''-disulphoanilino)-s-triazinylamino]benzene-1,5-disulphonic acid |
| 47 | 2-(2',4'-dichloro-s-triazinylamino)-5-(2'-chloro-4'-methoxy-s-triazinylamino)benzene-1,4-disulphonic acid |
| 48 | 2-(2',4'-dichloro-s-triazinylamino)-5-(2'-chloro-4'-amino-s-triazinylamino)benzene-1,4-disulphonic acid |
| 49 | 2-(2',4'-dichloro-s-triazinylamino)-5-[2'-chloro-4'-(m-sulphoanilino)-s-triazinylamino]benzene-1,4-disulphonic acid |
| 50 | 2-(2',4'-dichloro-s-triazinylamino)-5-[2'-chloro-4'-(3'',5''-disulphoanilino)-s-triazinylamino]benzene-1,4-disulphonic acid |
| 51 | 2-(2',4'-dichloro-s-triazinylamino)-5-[2'-chloro-4'-(2'',5''-disulphoanilino)-s-triazinylamino]benzene-1,4-disulphonic acid |
| 52 | 2-(2',4'-dichloro-s-triazinylamino)-5-[2'-chloro-4'-(4''-sulphoanilino)-s-triazinylamino]benzene-1,4-disulphonic acid |
| 53 | 2-(2',4'-dichloro-s-triazinylamino)-5-[2'-chloro-4'-(2'',4''-disulphoanilino)-s-triazinylamino]benzene-1,4-disulphonic acid |
| 54 | 2-(2',4'-dichloro-s-triazinylamino)-5-[2'-bromo-4'-(2'',4''-disulphoanilino)-s-triazinylamino]benzene-1,4-disulphonic acid |
| 55 | 2-(2',4'-dichloro-s-triazinylamino)-5-[2'-chloro-4'-(2''-methyl-5''-sulphoanilino)-s-triazinylamino]benzene- |

-continued

| Example | Acylating Agent |
|---|---|
| | 1,4-disulphonic acid |
| 56 | 2-(2',4'-dichloro-s-triazinylamino)-5-[2'-chloro-4'-(o-sulphoanilino)-s-triazinylamino]benzene-1,4-disulphonic acid |
| 57 | 2-(2',4'-dichloro-s-triazinylamino)-5-[2'-chloro-4'-(N''-sulphomethylanilino)-s-triazinylamino]benzene-1,4-disulphonic acid |
| 58 | 2-(2',4'-dichloro-s-triazinylamino)-5-[2'-chloro-4'-(3'',6'',8''-trisulphonaphthyl-1''-amino)-s-triazinylamino]benzene-1,4-disulphonic acid |
| 59 | 2-(2',4'-dichloro-s-triazinylamino)-5-[2'-chloro-4'-(4'',6'',8''-trisulphonaphthyl-2''-amino)-s-triazinylamino]benzene-1,4-disulphonic acid |
| 60 | 2-(2',4'-dichloro-s-triazinylamino)-5-[2'-chloro-4'-(N''-methyl-3''-sulphoanilino)-s-triazinylamino]benzene-1,4-disulphonic acid |
| 61 | 2-(2',4'-dichloro-s-triazinylamino)-5-[2'-chloro-4'-(2''-methyl-4'',5''-disulphoanilino)-s-triazinylamino]benzene-1,4-disulphonic acid |
| 62 | 2-(2',4'-dichloro-s-triazinylamino)-5-[2'-chloro-4-sulphomethylamino-s-triazinylamino]benzene-1,4-disulphonic acid |
| 63 | 2-(2',4'-dichloro-s-triazinylamino)-6-[2'-chloro-4'-(3'',6'',8''-trisulphonaphthyl-1''-amino)-s-triazinylamino]naphthalene-4,8-disulphonic acid |
| 64 | 2-(2',4'-dichloro-s-triazinylamino)-6-[2'-chloro-4'-(3'',5''-disulphoanilino)-s-triazinylamino]naphthalene-4,8-disulphonic acid |
| 65 | 2-(2',4'-dichloro-s-triazinylamino)-6-[2'-chloro-4'-(4'',6'',8''-trisulphonaphthyl-2''-amino)-s-triazinylamino]naphthalene-4,8-disulphonic acid |
| 66 | 1-(2',4'-dichloro-s-triazinylamino)-5-[2'-chloro-4'-(3'',6'',8''-trisulphonaphthyl-1''-amino)-s-triazinylamino]naphthalene-3,7-disulphonic acid |

EXAMPLE 67

Preparation of the dye of Formula (7) wherein $M^2(Q)_x$ is 4-(beta-sulphatoethylsulphonyl)phenoxy and W is $NH_2$ The procedure of Example 1 may be followed except that in the dianilide of Formula (6) $M^2(Q)_x$ is 4-(beta-hydroxyethylsulphonyl)-phenoxy rather than phenoxy to give the title compound.

EXAMPLE 68

Preparation of the dye of Formula (7) wherein $M^2(Q)_x$ is 4-(beta-sulphatoethylsulphonyl)phenoxy and W is $NHCH_2CH_2NH_2$ The procedure of Example 1 may be followed except that W in the dianilinide of the Formula (6) is $-NHCH_2CH_2NH_2$ rather than $NH_2$, and $M^2(Q)_x$ is 4-(beta-hydroxyethylsulphonyl)phenoxy rather than thiophenoxy, to give the title product.

EXAMPLES 69 TO 76

Mixed bifunctional reactive dyes may be prepared by following the procedure of Example 10 except that in place of the dyebase from Example 1 there is used the dye of the Example shown in the second column of Table 1, and in place of methoxydichloro-s-triazine there is used the acylating agent shown in the third column of Table 1.

TABLE 1

| Example | Dye | Acylating agent |
|---|---|---|
| 69 | 67 | 2,4-difluoro-6-(3-sulphophenylamino)triazine |
| 70 | 68 | 2,4-difluoro-6-(3-sulphophenylamino)triazine |
| 71 | 67 | 2,4-dichloro-6-(3-sulphophenylamino)triazine |
| 72 | 68 | 2,4-difluoro-6-(3-sulphophenylamino)triazine |
| 73 | 67 | 2,4,6-trichlorotriazine |
| 74 | 68 | 2,4,6-trichlorotriazine |
| 75 | 67 | 2,4-dichloro-6-(4-beta-sulphatoethylsulphonyl phenylamino)triazine |
| 76 | 68 | 2,4-dichloro-6-(4-beta-sulphatoethylsulphonyl phenylamino)triazine |

I claim:

1. Reactive dyes which, in the free acid form, have the Formula (1):

$$R^1(Q)_x \cdots (A^1)_n \cdots T^2 \cdots (SO_3H)_m \cdots [N-B]_y-N-Z \quad (1)$$
with substituents $R^2$, $R^3$, $(SO_3H)_m$, $T^1$, $(A^2)_n$ wherein
$T^1$ & $T^2$, each independently, represents H, Cl, Br, F, $SO_3H$ or an optionally substituted alkyl or phenyl radical;
$A^1$ & $A^2$ each independently represents Cl, Br, COOH, $SO_3H$ or optionally substituted alkyl, alkoxy or sulphamoyl;
each n independently has a value of 0, 1 or 2;
each m independently has a value of 1 or 2;
$R^1$ represents H or an optionally substituted alkyl or phenyl radical;
Q represents O or S;
x has a value of 0 or 1;
B represents an optionally substituted divalent alkylene, phenalkylene, naphthalkylene, phenylene or naphthylene radical;
$R^2$ & $R^3$ each independently represents H or an optionally substituted alkyl or phenyl radical or $R^2$ and $R^3$ together with B and the two N atoms form a piperazine ring;
y has a value of 0 or 1, and
Z represents a fibre-reactive group;
provided that y is 0 when $R^1$ does not contain a fibre-reactive group.

2. Reactive dyes according to claim 1 wherein $T^1$ and $T^2$ are each independently selected from Cl, Br and $C_{1-4}$-alkyl.

3. Reactive dyes according to claim 1 wherein $A^1$ and $A^2$ are each independently $C_{1-4}$-alkyl or $C_{1-4}$-alkoxy.

4. Reactive dyes according to claim 1 wherein $R^1$ is an optionally substituted $C_{1-4}$-alkyl or an optionally substituted phenyl radical.

5. Reactive dyes according to claim 1 wherein $R^1$ is a phenylene radical having a substituent which is convertible by means of alkali to a vinyl sulphone group.

6. Reactive dyes according to claim 1 wherein B is ethylene; 1,2- or 1,3-propylene; 2-hydroxy-1,3-propylene; benzylene; optionally sulphonated 1,3- or 1,4-phenylene; or optionally sulphonated 1,4-naphthylene.

7. Reactive dyes according to claim 1 wherein the fibre reactive group is either a heterocyclic reactive group, or alternatively a vinyl sulphonyl group or precursor thereof.

8. Reactive dyes according to claim 7 wherein the reactive group is a triazinyl or pyrimidinyl reactive group.

9. Reactive dyes according to claim 1 wherein the fibre reactive group is a triazin-2-yl group having a F, Br, Cl or quaternary ammonium group at either or both of the 4- and 6-positions and a substituent not reactive to cellulose in the remaining 4- or 6-position.

10. Compounds of the Formula (2) wherein $T^1$, $T^2$, $A^1$, $A^2$, n, m, Q, x, B, $R^2$ and $R^3$ are as defined in claim 1, $M^1$ is H or an optionally substituted hydrocarbon radical, $M^2$ is a hydrocarbon radical having an acylatable substituent, and y is 1

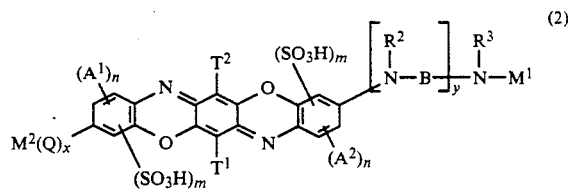

* * * * *